2,803,666

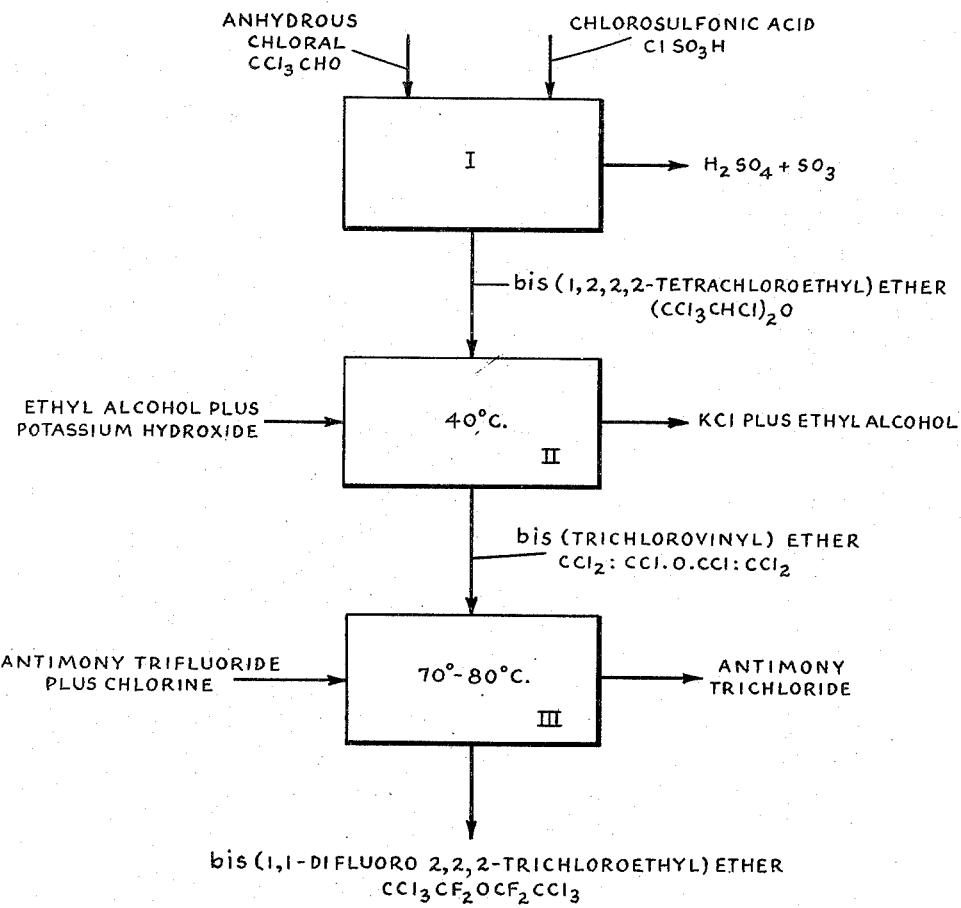
INVENTORS.
CHARLES B. MILLER
CYRIL WOOLF
BY
ATTORNEY OR AGENT.

FLUORINE CONTAINING ETHERS AND PROCESS FOR PREPARATION THEREOF

Charles B. Miller, Lynbrook, and Cyril Woolf, Long Island City, N. Y., assignors to Allied Chemical & Dye Corporation, New York, N. Y., a corporation of New York Application May 5, 1953, Serial No. 353,195

4 Claims. (Cl. 260—614)

This invention relates to linear ethers containing a difluorinated carbon atom in the alpha or "1" position in each of the two radicals linked to the oxygen, these radicals being perhalogenated and containing at least one halogen atom which is other than fluorine. In particular it relates to bis (1,1-difluoro perhaloalkyl) ethers of this type. This invention is also directed to a method of making 1,1,1',1'-tetrafluorinated ethers from perhalogenated ethers.

Prior to our invention, it has not been commercially feasible to manufacture perhalogenated linear ethers containing fluorine groups in the alpha or "1" positions. When this has been tried, the number and location of the fluorine atoms in the molecules of the reaction products, have been unpredictable, and their precise control has not heretofore been attainable. When attempting to alpha, alpha' tetrafluorinate a perhalogenated compound such as e. g. a bis (perchloroalkyl) ether, it has been observed that the fluorine, if it reacts at all, reacts with the —CCl₃ group or groups present to form —CCl₂F, —CClF₂, and —CF₃. It is however generally acknowledged that it is difficult or impossible to economically and selectively replace both halogens on e. g. an alpha —CCl₂— or —CBr₂— group with fluorine, because of the sluggishness of the reaction, the extremely low yields, and the comparatively large production of difficultly separable isomers.

Furthermore the use of highly oxidizing fluorinating compounds such an antimony pentafluoride to accomplish fluorination has generally been avoided because they tend to promote molecular scission with attendant low yields and difficulties of recovery and purification. Neither this compound nor others generally thought to be equivalent thereto or as substitutes therefor has been successful in controlling the introduction of fluorine into groups such as —CCl₂— situated in the alpha and alpha' positions in an ether.

One object of this invention is to set forth a fluorination procedure wherein (a) antimony trifluoride plus a halogen, preferably chlorine, or (b) antimony trifluoride plus antimony pentahalide, preferably antimony pentachloride, or (c) pentavalent antimony salts (e. g. antimony pentachloride) plus hydrogen fluoride, may be employed to prepare fluorinated compounds of predetermined composition and of desired purity.

A second object of this invention is to set forth a method of preparing linear ethers containing two perhalogenated radicals each of which contains two fluorine atoms on the alpha carbon atom thereof, including linear bis (1,1,1',1' tetrafluoroperhalohydrocarbon) ethers.

A third object of this invention is to set forth as new products linear bis (1,1,1',1'-tetrafluoroperbromohydrocarbon) ethers, bis 1,1,1',1'-tetrafluoroperchlorohydrocarbon) ethers, and 1,1,1',1'-tetrafluoro ethers containing groups which are completely halogenated, at least one of the halogens being other than fluorine.

Other objects of this invention will be apparent to those skilled in the art on an inspection of the accompanying drawing and the following description.

By a linear ether is meant an ether having the grouping —C—O—C— wherein the oxygen atom is joined to two carbon atoms which are not joined directly to each other. The desired products generally have the formula $$RC_nY_{2n}CF_2OCF_2C_{n'}Y'_{2n'}R'$$

wherein Y and Y' are either fluorine, chlorine, or bromine, and are preferably but not necessarily the same and at least one of each of Y and Y' is other than fluorine; R is either Y or a perhalo-, perfluoro-, perchloro-, or perbromo- -aliphatic, -aromatic, or -cycloaliphatic hydrocarbon radical; R' is either Y' or a perhalo-, perfluoro-, perchloro-, or perbromo- -aliphatic, -aromatic, or -cycloaliphatic hydrocarbon radical, R and R' being preferably but not necessarily the same; and $n$ and $n'$ are integers. A specific group of useful new products is that included within the general formula $$C_nY_{2n+1}CF_2OCF_2C_{n'}Y'_{2n'+1}$$

In the general formulae, all the values of Y and Y' need not be identical, i. e. some of the Y atoms may be fluorine or chlorine and others bromine. This group of new products thus includes hetero-perhalogenated ethers.

Among the new products which may be made by this invention are those in which R and R' may be selected from the following groups among others: Cl, Br, CCl₃—, CBr₃—, CClF₂—, CCl₃CCl₂—, CBr₃CBr₂—, CCl₃CBr₂—, CBr₃CCl₂—, C₆Cl₅—, C₆Br₅—, C₆Cl₄B₂—, C₆Cl₁₁—, C₆Br₁₁—, C₆Cl₁₀Br—; $n$ may be 1,2,3 or any other integer. Typical compounds which may be produced include the symmetrical ethers;

(CCl₃CF₂)₂O
(CBr₃CF₂)₂O
(CCl₃CCl₂CCl₂CF₂)₂O
(CCl₃CBr₂CBr₂CF₂)₂O
(CBr₃CBr₂CBr₂CF₂)₂O
(C₆Cl₅CCl₂CF₂)₂O
(C₆Cl₁₁CCl₂CF₂)₂O
(C₆Cl₁₁CCl₂CBr₂CF₂)₂O

Typical non-symmetrical ethers include:

CCl₃CF₂.O.CF₂CBr₃
CCl₃CCl₂CF₂.O.CF₂CBr₂CCl₃
CCl₃CBr₂CF₂.O.CF₂CCl₂CBr₃

These new fluorinated products are particularly valuable as intermediates in the production of organic chemicals, dyes, synthetics, and pharmaceuticals containing controlled amounts of fluorine in positively ascertainable positions. This is true because the preparation thereof results in the formation of substantially no isomers or other undesirable by-products. In addition their physical and chemical properties permit their use as solvents, diluents, reaction media, or heat exchange media.

According to another aspect of this invention, a preferred method of producing these novel products, employs as a starting ether, a material corresponding to the desired product, except that the two alpha carbons bear either bromine or chlorine atoms. This starting ether is subjected to the action of a fluorinating agent, selected from the group consisting of (a) antimony pentachloride plus antimony trifluoride, (b) antimony trifluoride plus a halogen, preferably chlorine, and (c) pentavalent antimony salts (e. g. antimony pentachloride) plus hydrogen fluoride.

The reaction proceeds very smoothly at temperatures between about 20° C. and the boiling point of the ethers present, preferably below about 120° C., the alpha substituted halogen being readily replaced by fluorine under these conditions. The reaction may be effected in a liquid menstruum of the starting ether or mixtures thereof with the product ether, to which the fluorinating agent has been added or may be added during the course of the reaction. Antimony pentachloride may be employed in liquid form; antimony trifluoride may be employed in solid form; chlorine gas or hydrogen fluoride if used, may be introduced into the reaction mixture during the course of the reaction. Agitation may be employed for improving contact between phases. Reaction usually proceeds to completion within a few hours, and the fluorinated reaction product may be purified by conventional procedures. Use of the indicated fluorinating agents results in formation of substantially no products other than the desired tetrafluorinated products. The yield of the desired product is ordinarily above 85% based on the starting ether.

Typical starting ethers which may be employed in practice of this invention include completely halogenated linear ethers containing a 1,2-double bond in each of the perhalohydrocarbon radicals. Compounds which may be treated according to this method include those having the type formula:

$RC_nY_{2n}CX:CZ.O.CZ':CX'.C_{n'}Y'_{2n'}R'$ wherein X, X', Y and Y' are either fluorine, chlorine, or bromine, X' and Y' respectively being preferably but not necessarily the same as X and Y respectively: Z and Z' are either chlorine or bromine, Z' being preferably but not necessarily the same as Z; R is either Y or a perhaloaliphatic, a perhaloaromatic, or a perhalocycloaliphatic hydrocarbon radical; R' is either Y' or a perhaloaliphatic, a perhaloaromatic, or a perhalocycloaliphatic hydrocarbon, R' being preferably but not necessarily the same as R; and $n$ and $n'$ are integers not necessarily the same. A specific group of compounds capable of being treated by this method is that having the general formula

$C_nY_{2n+1}CX:CZ.O.CZ':CX'C_{n'}Y'_{2n'+1}$ the bis (1-halo, 2-halo', perhalohydrocarbon-ene-1) ethers. In both general formulae all the Y and Y' atoms need not be identical. Included in this group are the bis (1,2-dichloroperchloroalkenyl-1) ethers.

Among the starting materials which may be treated by this process, the following may be listed:

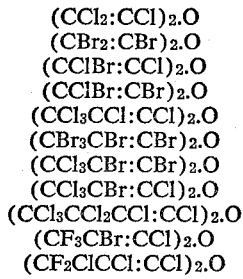

$(CCl_2:CCl)_2.O$
$(CBr_2:CBr)_2.O$
$(CClBr:CCl)_2.O$
$(CClBr:CBr)_2.O$
$(CCl_3CCl:CCl)_2.O$
$(CBr_3CBr:CBr)_2.O$
$(CCl_3CBr:CBr)_2.O$
$(CCl_3CBr:CCl)_2.O$
$(CCl_3CCl_2CCl:CCl)_2.O$
$(CF_3CBr:CCl)_2.O$
$(CF_2ClCCl:CCl)_2.O$

Typical non-symmetrical starting ethers include the following:

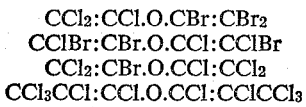

$CCl_2:CCl.O.CBr:CBr_2$
$CClBr:CBr.O.CCl:CClBr$
$CCl_2:CBr.O.CCl:CCl_2$
$CCl_3CCl:CCl.O.CCl:CClCCl_3$

Other typical starting ethers which may be employed in practice of this invention include completely halogenated linear ethers containing 1,1,1',1'-tetrachloroperhalohydrocarbon radicals or 1,1,1',1'-tetrabromoprehalohydrocarbon radicals, to obtain the product 1,1,1',1'-tetrafluoroperhalohydrocarbon ether. Compounds which may be treated according to this method include those having the type formula:

$RC_nY_{2n}CX_2OCX'_2C_{n'}Y'_{2n'}R'$ wherein Y and Y' are either fluorine, chlorine, or bromine, Y' being preferably but not necessarily the same as Y; X and X' are either chlorine or bromine, X' being preferably but not necessarily the same as X; R is either Y or a perhaloaliphatic, a perhaloaromatic, or a perhalocycloaliphatic radical; R' is either Y' or a perhaloaliphatic, a perhaloaromatic, or a perhalocycloaliphatic radical, R' being preferably but not necessarily the same as R; and $n$ and $n'$ are integers not necessarily the same. A specific group of compounds which may be treated according to this method is that typified by the general formula:

$C_nY_{2n+1}CX_2.O.CX'_2C_{n'}Y'_{2n'+1}$

In each of these formulae all the Y and Y' atoms need not be identical.

Among the starting materials in this category which may be employed, the following are noted:

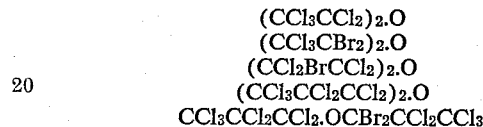

$(CCl_3CCl_2)_2.O$
$(CCl_3CBr_2)_2.O$
$(CCl_2BrCCl_2)_2.O$
$(CCl_3CCl_2CCl_2)_2.O$
$CCl_3CCl_2CCl_2.OCBr_2CCl_2CCl_3$

EXAMPLE

According to a particular embodiment of this invention a bis(perhalogenated ether) containing a double bond on the 1 carbon, such as bis (trichlorovinyl) ether is refluxed with $SbF_3$ during the introduction of chlorine for an appropriate time, until the fluorine has entered both groups and become attached to the alpha carbons. The product ether is separated from the reaction product, distilled, washed, dried and redistilled to prepare pure bis (1,1-difluoro 2,2,2-trichloroethyl) ether.

In the accompanying drawing is set forth a schematic flow diagram of one embodiment of this invention showing a method of preparation of bis (1,1-difluoro 2,2,2-trichloroethyl) ether from anhydrous chloral as starting material.

*Step I*

In the reaction Step I, designated by the uppermost box in the drawing, in one embodiment, 400 parts by weight of anhydrous chloral are slowly dropped into 720 parts by weight of chlorosulfonic acid over a period of 40 minutes.

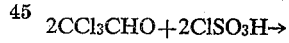
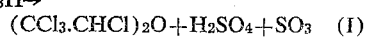

$2CCl_3CHO + 2ClSO_3H \rightarrow$
$(CCl_3.CHCl)_2O + H_2SO_4 + SO_3$ (I)

After 19 hours at room temperature, the reaction mixture is slowly poured onto ice over a period of 2 hours. The semi-solid product is taken up in 350 parts by volume of chloroform. The chloroform layer is washed with water and dried over anhydrous sodium sulfate. 250 parts by volume of chloroform is distilled off at atmospheric pressure and the remaining chloroform is removed under vacuum at temperature of 35° C. The main product distilled at 142° C.–146° C./16mm. with slight decomposition toward the end. The residue is 72 parts by weight of black solid. The product is 223 parts by weight (47% yield) of almost solid bis (1,2,2,2-tetrachloroethy) ether.

*Step II*

As indicated schematically in the second box of the drawing, 220 parts by weight (0.63 mol) of the octachloroether prepared in Step I, is mixed with 10 parts by weight of ethyl alcohol and slowly added to a solution of 84 parts by weight of technical potassium hydroxide (85%) in 80 parts by weight of water. Cooling and efficient stirring are required to maintain the exothermic reaction at the desired reaction temperature of 40° C. for 2 hours. Water was added to dissolve the KCl and a colorless oily layer (175 parts by weight) separated. The aqueous layer contained 0.27 mol of unreacted potassium hydroxide, which was 20% of that added as charge. On fractionation of the oily layer 82 parts by weight of product, bis (trichlorovinyl) ether distilled over at 116° C.–130° C./11 mm. This material is a very pleasant smelling liquid, which at room temperature undergoes very sluggish photo-chlorination.

(CCl$_3$CHCl$_2$) + 2KOEt →
2KCl + 2EtOH + CCl$_2$:CCl.O.CCl:CCl$_2$  (II)

*Step III*

260 parts by weight of bis (trichlorovinyl) ether are stirred with 330 parts by weight (1.86 mols) of antimony trifluoride and 262 parts by weight (3.7 mols) chlorine is added during 3 hours. The temperature may be maintained at 70° C.–80° C. with ice cooling.

3CCl$_2$:CCl.O.CCl:CCl$_2$ + 6Cl$_2$ + 4SbF$_3$ →
3CCl$_3$CF$_2$.O.CF$_2$CCl$_3$ + 4SbCl$_3$  (III)

The reaction product was decomposed with aqueous HCl and the oil was separated and dried (200 parts by weight). The bulk of the product bis (1,1-difluoro 2,2,2-trichloroethyl) ether distilled at 191° C.–193° C. at atmospheric pressure, and had a freezing point of −38° C. to −43° C. This material is insoluble in water, has a sweet camphor-like odor, and is not attacked by refluxing with 95% sulfuric acid.

Reaction Step III may occur through a two step mechanism, the first step of which involves a chlorination of the unsaturated starting material to form the perchlorinated ether, viz.

CCl$_2$:CCl.O.CCl:CCl$_2$ + Cl$_2$ →
CCl$_3$CCl$_2$.O.CCl$_2$CCl$_3$  (IV)

This first step may be catalyzed by the presence of pentavalent antimony halides such as the antimony pentachlorofluorides which may be formed by either of the following reactions depending on the particular fluorinating agents which are present:

SbF$_3$ + Cl$_2$ → SbF$_3$Cl$_2$  (V)

SbF$_3$ + SbCl$_5$ → SbF$_3$Cl$_2$ + SbCl$_3$  (VI)

The perchlorinated ether is then fluorinated in the disclosed manner by the fluorinating agent. The 1,1,1′,1′-tetrafluorinated ethers may also be prepared directly from the 1,1,1′,1′-tetrahalogenated perhalohydrocarbon ethers. In particular bis (pentachloroethyl) ether may be used to prepare bis (1,1-difluoro 2,2,2-trichloroethyl) ether.

Other examples of reactions which may be conducted in similar manner to give comparable yields of products are:

5CCl$_3$CCl$_2$.O.CCl$_2$CCl$_3$ + 4SbF$_3$ $\xrightarrow{SbCl_5}$
5CCl$_3$CF$_2$.O.CF$_2$CCl$_3$ + 4SbCl$_3$  (VII)

(CBr$_2$CBr$_3$)$_2$O + 4HF $\xrightarrow{SbCl_5}$ (CBr$_2$CF$_2$)$_2$O + 4HBr  (VIII)

CCl$_3$CBr$_2$.O.CBr$_2$CBr$_3$ + 4HF $\xrightarrow{SbCl_5}$
CCl$_3$CF$_2$.O.CF$_2$CBr$_3$ + 4HBr  (IX)

The above examples are only illustrative of the various fluorinated ethers which may be prepared by the methods hereinbefore set forth, as is apparent to those skilled in the art.

In the specification and claims, the term halogen is employed to include fluorine, chlorine, and bromine. A perhalohydrocarbon radical is one wherein all the hydrogen atoms of a hydrocarbon radical have been replaced by halogens, all of the halogens not necessarily being the same.

We claim:

1. The linear ether having the formula:

CCl$_3$CF$_2$OCF$_2$CCl$_3$

2. The method of preparing an ether product having the formula

CZ$_3$.CF$_2$.O.CF$_2$.CZ′$_3$ wherein Z and Z′ are selected from the group consisting of chlorine and bromine, which method comprises reacting a starting ether, having the formula

CZ$_2$:CX.O.CX′:CZ′$_2$ wherein X and X′ are selected from the group consisting of chlorine and bromine, with antimony trifluoride and chlorine, at temperature substantially in the range of 20° C. to the boiling point of the said product ether, for a time sufficient to effect change of each of X and X′ with F and to form said product ether.

3. The method of preparing bis (1,1-difluoro 2,2,2-trichloroethyl) ether which comprises reacting bis (trichlorovinyl) ether with antimony trifluoride and chlorine.

4. The method of claim 3 wherein temperature of reaction is substantially in the range of 20° C. to the boiling point of said product ether.

References Cited in the file of this patent

UNITED STATES PATENTS

| | | |
|---|---|---|
| 2,471,829 | McBee et al. | Mar. 31, 1949 |
| 2,500,388 | Simons | Mar. 14, 1950 |
| 2,533,133 | McBee et al. | Dec. 5, 1950 |
| 2,567,569 | McBee et al. | Sept. 11, 1951 |
| 2,669,182 | Miller | Feb. 2, 1954 |
| 2,691,052 | Cines | Oct. 5, 1954 |

OTHER REFERENCES

Newer Methods of Preparative Organic Chemistry (Die Chemie, translated), Interscience Publishers, 1948 (pp. 238–241).